INVENTOR.
Otto R. Schweitzer
BY
James L. O'Brien
ATTORNEY.

INVENTOR.
Otto R. Schweitzer
BY
James L. O'Brien
ATTORNEY.

INVENTOR.
Otto R. Schweitzer
BY
James L. O'Brien
ATTORNEY.

United States Patent Office 3,352,282
Patented Nov. 14, 1967

3,352,282

VACUUM DEPOSIT DEVICE INCLUDING MEANS TO REGISTER AND MANIPULATE MASK AND SUBSTRATE ELEMENTS

Otto R. Schweitzer, Rochester, N.Y., assignor, by mesne assignments, to The Bendix Corporation, Detroit, Mich., a corporation of Delaware Filed July 23, 1965, Ser. No. 474,353
5 Claims. (Cl. 118—49)

The present invention relates generally to vacuum evaporation coating apparatus and more particularly to apparatus for mounting substrates in selective relation to an evaporation source.

The production of thin film circuits often involves the vacuum deposition of a plurality of different vaporized materials in layers on a glass or ceramic substrate. Masks are provided to control the configuration of each layer. It has previously been proposed to open the vacuum chamber after each material deposition to reposition the substrate with respect to the appropriate mask and vapor source for a subsequent deposition. Breaking the vacuum between each deposition not only slows down the process but also permits contamination of the already deposited thin films.

It is an object of the invention to provide a versatile fixture for a vacuum evaporation coating apparatus which holds a plurality of substrates and masks and permits the use of any mask or any substrate in any sequence with any vapor source in the apparatus without breaking the vacuum.

It is a further object of the present invention to provide in vacuum evaporation coating apparatus improved means for accurately registering a mask with a substrate.

It is a still further object of the present invention to provide in a vacuum evaporation coating apparatus improved mounting means for substrates which readily accommodates for thermal expansion with a minimum of substrate distortion.

These and other objects and advantages of the present invention will become readily apparent from the following detailed description taken in connection with the appended drawings in which.

Figure 1:
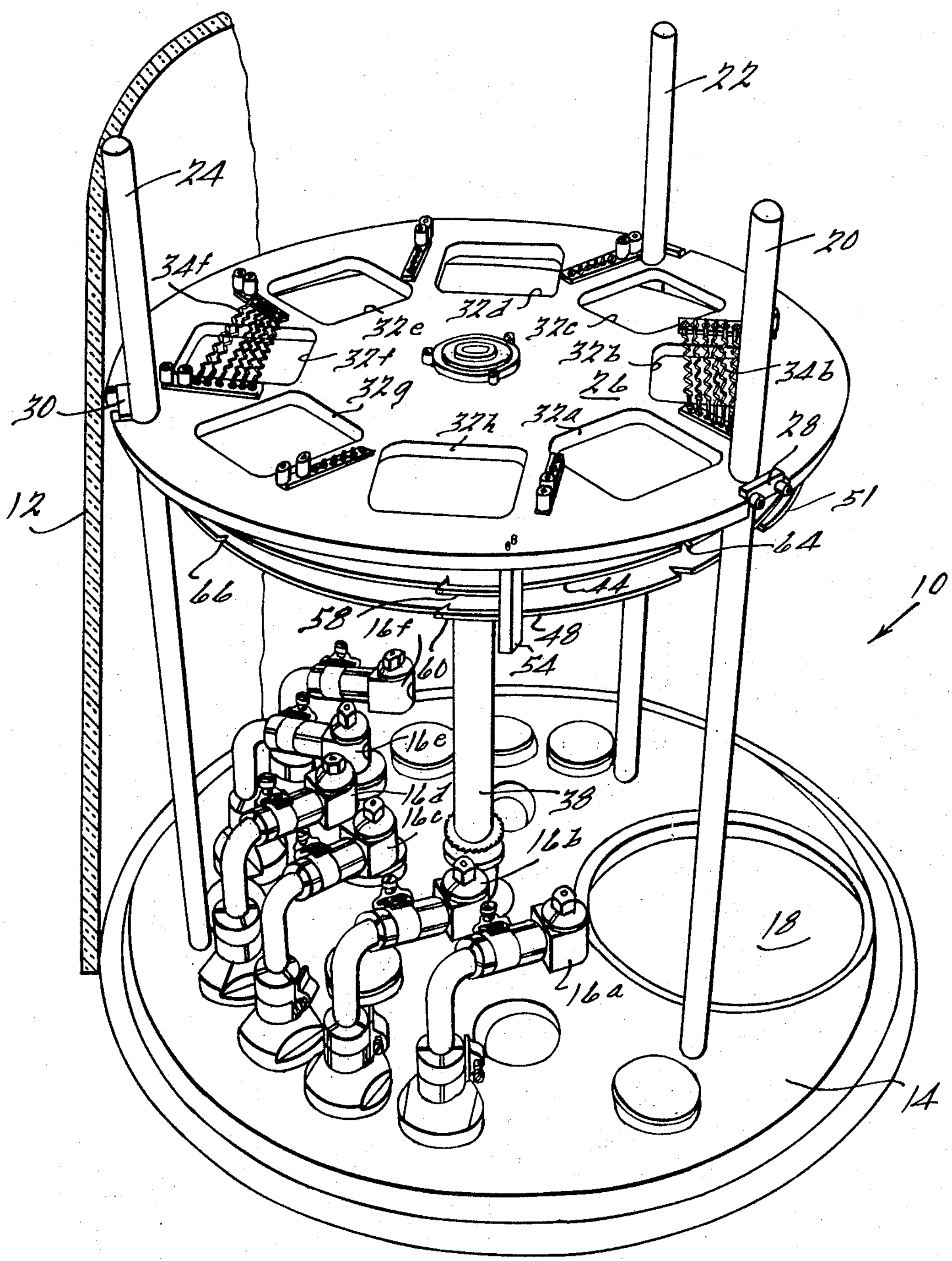
FIGURE 1 is a perspective view of a vacuum evaporation coating apparatus embodying the present invention.

Referring now to the drawings and more particularly to FIGURE 1, numeral 10 designates a vacuum evaporation coating apparatus having a vacuum chamber or bell jar 12 mounted on a base plate 14 which carries a plurality of evaporant sources 16*a–f*. A port 18 in base plate 14 is adapted to be connected to a suitable vacuum pump, not shown. Three rods 20, 22 and 24 extend vertically from base plate 14 and are disposed to receive a stationary heater plate 26 which is adjustably secured to said rods by clamps, two of which are shown at 28 and 30. Heater plate 26 is formed with a plurality of ports or openings 32*a–h* each of which is adapted to respectively receive an electric heater assembly 34*a–h*.

Figures 2, 3, 4:
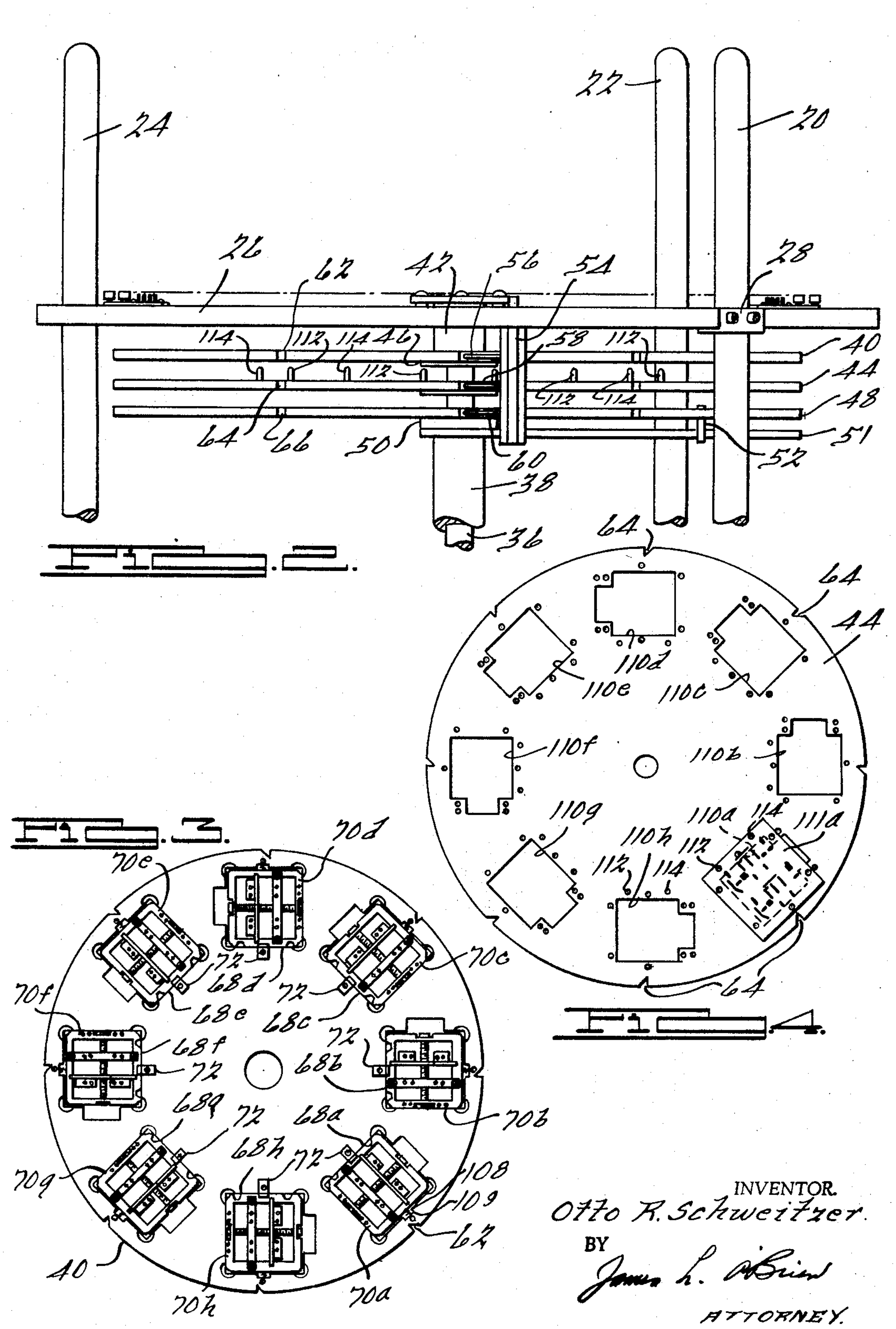
FIGURE 2 is an elevation view of a portion of the apparatus shown in FIGURE 1.
FIGURE 3 is a top view of the substrate plate shown in FIGURE 2.
FIGURE 4 is a top view of the mask plate shown in FIGURE 2.
Figure 8:
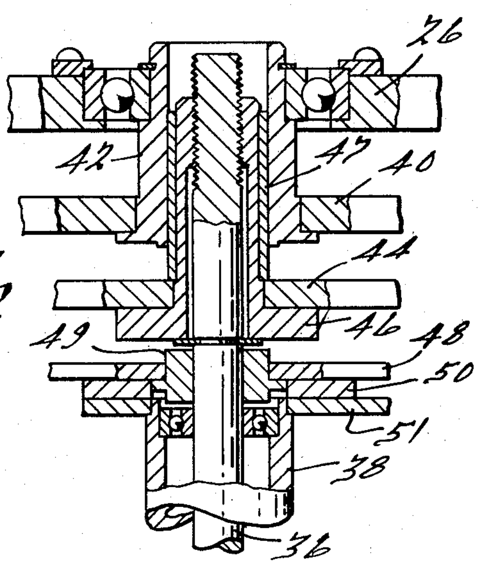
FIGURE 8 is a sectional schematic view of the drive means in FIGURE 1.

Referring now to FIGURES 2 and 8, first and second coaxial drive shafts respectively numbered 36 and 38 extend through the base plate 14 for connection to suitable manual actuating means, not shown. A substrate plate 40 is secured to a rotatable flanged hollow shaft 42 which depends from heater plate 26 and is coaxial with the first drive shaft 36. A mask plate 44 is secured to a drive means or motion converter 46 which is threadedly connected to drive shaft 36. As best seen in FIGURE 8, a bushing 47 separates drive means 46 from shaft 42. A shutter plate 48 is secured to a hub 49 rotatably mounted on the first drive shaft 36 below the mask plate 44. A washer 50 spaces shutter plate 48 from a sector plate 51 which is secured to second shaft 38. An abutment 52 (FIGURES 2 and 5) depends from shutter plate 48 into the path of sector plate 51 such that rotation of sector plate 51 in a clockwise direction causes the sector plate 51 to engage abutment 52 and further cause the shutter plate 48 to rotate in unison with it in a clockwise direction. A holder 54 depending from heater plate 26 carries three spring loaded pawls 56, 58, and 60 which are respectively adapted to engage notches 62, 64, and 66 (FIGURES 2, 3, 4, and 5) provided respectively in the periphery of plates 40, 44, and 48. The engagement of the pawls with the notches limits the direction of rotation of the plates.

As best seen in FIGURE 3, the substrate plate 40 is provided with a plurality of arcuately spaced openings 68*a–h* which correspond in number and approximately in size to the ports 32*a–h* in heater plate 26. Each of the openings 68*a–h* is adapted to receive a substrate holder 70, each of which is held in place by suitable clamps 72.

Figure 6:
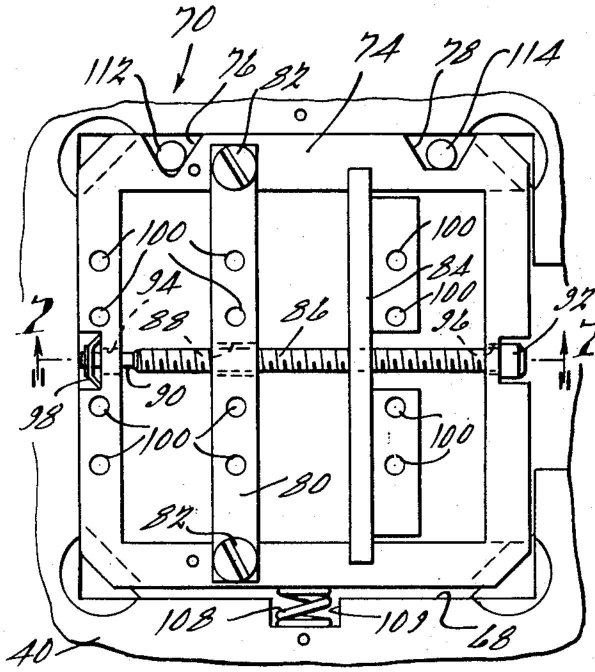
FIGURE 6 is a plan view of a substrate holder.
Figure 7:
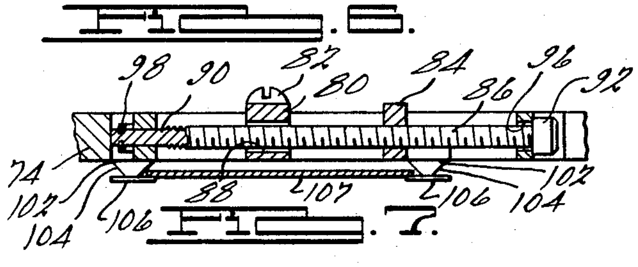
FIGURE 7 is a sectional view taken along lines 7—7 of FIGURE 6.

As best seen in FIGURES 6 and 7, each substrate holder 70 is provided with a frame 74 having a V-groove 76 and a truncated V-groove 78 formed in one side thereof. Frame 74 is spanned by a first cross bar 80 secured at its ends to frame 74 by suitable bolts 82 and by a second slidable cross bar 84 which threadedly receives a screw 86 so as to be moved longitudinally upon rotation of the screw. Screw 86 passes through a bore 88 in bar 80 and is rotatably mounted at its ends 90 and 92 in bores 94 and 96 formed in frame 74. A leaf spring 98 is secured to one end 90 of screw 86 to urge enlarged end 92 into engagement with frame 74. Bars 80 and 84 and frame 74 are provided with a plurality of threaded holes 100 which are adapted to receive a hold down button 102. Each hold down button 102 is formed with a conical wall portion 104 and an enlarged head portion 106. The buttons 102 are adapted to receive the edges of a substrate 107 as shown in FIGURE 7. A spring 108 mounted in a pocket 109 formed in plate 40 on one side of an opening 68 engages frame 74 to urge the holder 70 toward the opposite side of said opening. The bar 80 is useful when it is desired to mount a relatively small substrate near the center of an opening 68 but may be omitted in some installations.

Referring now to FIGURE 4, the mask plate 44 is provided with a plurality of arcuately spaced openings or ports 110*a–h* which correspond in number and in location to the openings or ports 68*a–h* in the substrate plate 40. Each of the openings 110*a–h* is adapted to receive a mask when in registration with a substrate 107 in corresponding openings 68*a–h* controls the pattern of deposition of material evaporized from source 16*a–h*. A typical mask 111*a* is shown mounted in opening 110*a* in FIGURE 4. It is desirable that any mask opening 110*a–h* be selectively registerable with any substrate holder opening 68*a–h*. It is further desirable that the registration be accurately repeatable and capable of accommodating dimensional changes resulting from temperature changes without degrading the accuracy of registration. In order to accurately register a mask plate 111 with a substrate holder 70*a–h*, a pair of spaced pins 112 and 114 project from mask plate 44 adjacent each opening 110 to respectively engage grooves or pin receiving means 76 and 78 in the substrate holders 70. Pin 112 is adapted to have a double tangential contact with groove 76 wherein pin 114 is adapted to have a single tangential contact with groove 78.

Upon initial clockwise rotation of first drive shaft 36, the driving means 46 converts the rotary motion of the shaft to axial motion to move the mask plate 44 upwardly toward substrate plate 40 to a position wherein the pins 112 and 114 are in engagement with grooves 76 and 78 and the appropriate mask 111 is in registration with the appropriate substrate holder 70*a–h*. In the lowest position of the mask 44, pawl 58 is in engagement with a notch 64 in the periphery of plate 44 to prevent clockwise rotation of the mask plate. After a predetermined rotation of shaft 36 the mask plate 44 is moved axially upwardly to a point where pawl 58 is out of engagement with notch 64 and the pins 112 and 114 are brought into engagement with substrate holder grooves 76 and 78 such that upon further clockwise rotation of shaft 36 the substrate plate 40 and mask plate 44 rotate in unison to permit substrate ports 68*a–h* and mask ports 110*a–h* to be aligned with any desired evaporant source 16*a–f*. Rotation of shaft 36 in a counter clockwise direction causes the mask plate 44 to be moved axially downwardly out of engagement with the substrate plate 40 to its lowest position and further rotation of shaft 36 in a counter clockwise direction will cause the mask plate 44 to rotate in a counter clockwise direction independently of substrate plate 40 to permit any opening or port 110*a–h* in mask plate 44 to be brought into alignment or registration with any opening or port 68*a–h* in the substrate plate 40. Pawl 56 limits counter clockwise rotation of substrate plate 40.

Figure 5:
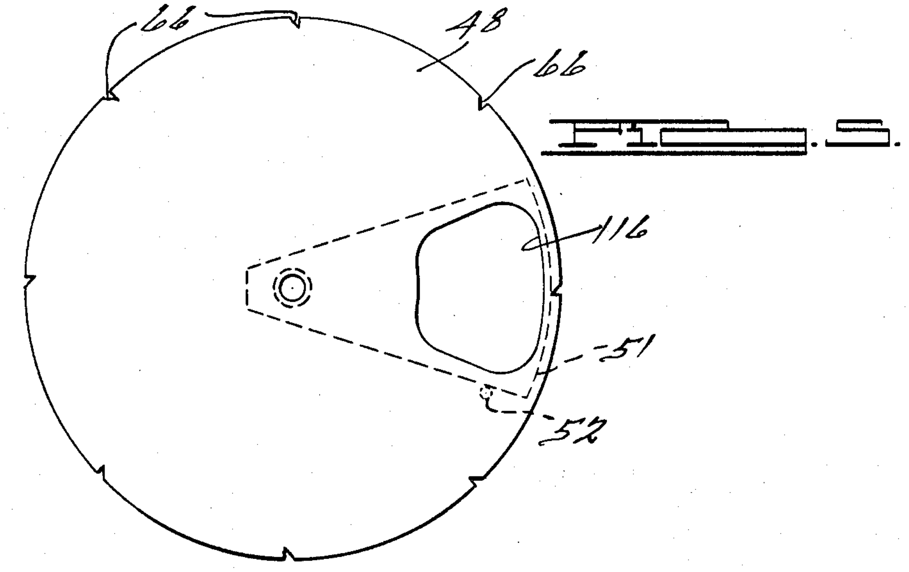
FIGURE 5 is a top view of the shutter plate 48.

As best seen in FIGURE 5, the shutter plate 48 is provided with a single opening or port 116 which is radially positioned for registration with an opening or port 110*a–h* in the mask plate 44. The sector plate 51, mounted below shutter plate 48, when rotated in a clockwise direction engages abutment 52 and is then in a position to cover port 116 to prevent evaporant from source 16*a–f* from reaching a substrate 107 mounted in plate 40. Rotation of the second drive shaft 38 in a clockwise direction with the sector plate 51 in engagement with abutment 52 causes shutter plate 48 to rotate in unison with sector plate 51. Rotation of second drive shaft 38 in counter clockwise direction rotates sector plate 51 counter clockwise to uncover the port 116. Pawl 60 engages a notch 66 to prevent rotation of shutter plate 48 in a counter clockwise direction.

In operation, the substrates 107 and appropriate mask 111 are mounted in their respective plates 40 and 44 and the appropriate evaporant material placed in sources 16*a–f*. The bell jar 12 is placed on the base plate 14 and the vacuum chamber defined by the bell jar is evacuated through the port 18. Heaters 34*a–h* maintain the substrate at the desired temperature during the coating operation. Various automatic control means, not shown, may be used to control the heaters so as to maintain the desired temperature. With the sector plate 51 in a position to close port 116 in shutter plate 48, the mask plate 44 is rotated counter clockwise by shaft 36 to bring the appropriate mask 111 into alignment with the desired opening 68*a–h* in substrate plate 40. Shaft 36 is rotated clockwise to bring plate 40 and 44 into engagement and then to rotate the assembly of the two plates clockwise to bring the appropriate openings 68*a–h* and 110*a–h* into alignment with the desired evaporant source 16*a–f*. The sector plate 51 is then rotated in a clockwise direction to rotate port 116 in the shutter plate 48 into alignment with the appropriate evaporant source and substrate holder. The sector plate is then rotated counter clockwise to open port 116 and allow the evaporant material to pass from a source 16*a–f* through a mask 111 to be deposited on a substrate 107 in a substrate holder 70*a–h*.

The shafts 36 and 38 are extended through the base plate 14 so that the various plates 40, 44, 48, and 51 may be rotated without removing the bell jar 12 and without breaking the vacuum. The substrate holder, mask, and sector plates can be rotated for substrate processing without sequencing restrictions. The shutter and sector plates provide controlled shielding of the mask and substrate to prevent undesired or unwanted deposition of material.

The substrate holder 74 can accommodate a wide variety of substrate sizes and shapes and can also readily accommodate a multiple of substrates. The configuration of holder buttons 102 accommodates a wide range of substrate thicknesses. Spring 98 provides resilient loads in the substrate holder 70 to accommodate for thermal expansion and contraction of the substrate and the holder itself through the operating temperature range. The pins 112 and 114 insure that the masks 111 will be properly registered with the appropriate substrate 107. It can be readily seen that an apparatus of the present invention provides a means for holding a plurality of substrates and masks to permit the use of any mask or any substrate in any sequence with any vapor source without breaking the vacuum.

Although only one embodiment of the present invention has been shown and described, it will be readily apparent to those skilled in the art that various changes and modifications can be made without departing from the spirit of the invention.

I claim:

1. In a vacuum evaporation coating apparatus having an evaporation source, first and second coaxial drive shafts, a substrate mounting plate having a plurality of openings formed therein rotatably mounted on said first drive shaft, a mask plate having a plurality of openings formed therein adapted to selectively register with the openings in said substrate mounting plate, drive means connected to said first drive shaft and to said mask plate, said drive means adapted to convert a predetermined rotary motion of said drive shaft to axial motion of said mask plate and to rotate said mask plate in conjunction with said first drive shaft after said initial predetermined rotary motion is exceeded, substrate holder means adapted to be mounted in each of the openings in said substrate mounting plate, a pair of spaced pins projecting from said mask plate, pin receiving means formed in said substrate holder means to receive said pins when said mask plate is in one of its extreme axial positions, said pins being out of engagement with said pin receiving means when said mask is in another of its extreme axial positions, a shutter plate rotatably mounted on said second drive shaft, port means formed in said shutter plate adapted for selective registration with an opening in said mask plate, an abutment formed on said shutter plate, a sector plate secured to said second drive shaft and adapted to be rotated in one direction into engagement with said abutment wherein said sector plate is in registration with said port means and wherein additional rotation of said sector plate in said one direction causes said shutter plate to rotate with said sector plate.

2. The apparatus of claim 1 wherein the pin receiving means comprises first and second grooves, said first groove adapted to have double tangential contact with one of said pins and second groove adapted to have single tangential contact with another of said pins.

3. The apparatus of claim 1 wherein said substrate, mask, and shutter plates are each formed with a plurality of spaced periphery notches, and spring loaded pawl means are provided for engagement with said notches to limit the direction of rotation of said plates.

4. The apparatus of claim 1 wherein said substrate holder means comprises a frame, a first mounting button having a conical wall portion and enlarged head portion secured to said frame, a member reciprocably mounted on said frame, resilient means urging said member toward said first mounting button, and a second mounting pin having a conical wall and an enlarged head portion secured to said member, said buttons being adapted to engage the substrate.

5. In a vacuum evaporation coating apparatus having an evaporation source, first and second coaxial drive shafts, a substrate mounting plate having a plurality of openings formed therein rotatably mounted on said first drive shaft, a mask plate having a plurality of openings formed therein adapted to selectively register with the openings in said substrate mounting plate, drive means connected to said first drive shaft and to said mask plate, said drive means adapted to convert a predetermined rotary motion of said drive shaft to axial motion of said mask plate and to rotate said mask plate in conjunction with said first drive shaft after said initial predetermined rotary motion is exceeded, a shutter plate rotatably mounted on said second drive shaft, port means formed in said shutter plate adapted for selective registration with an opening in said mask plate, an abutment formed on said shutter plate, a sector plate secured to said second drive shaft and adapted to be rotated in one direction into engagement with said abutment wherein said sector plate is in registration with said port means and wherein additional rotation of said sector plate in said one direction causes said shutter plate to rotate with said sector plate.

References Cited

UNITED STATES PATENTS

| | | | |
|---|---|---|---|
| 2,410,720 | 11/1946 | Dimmick | 118—49 |
| 2,746,420 | 5/1956 | Steigerwald | 118—49.1 X |
| 3,023,727 | 3/1962 | Theodoseau et al. | 117—107.1 |
| 3,092,329 | 6/1963 | Twaroch. | |
| 3,117,025 | 1/1964 | Learn et al. | 118—49 |
| 3,206,322 | 9/1965 | Morgan | 118—49.1 |
| 3,207,126 | 9/1965 | Byron | 118—49 |
| 3,238,918 | 3/1966 | Radke | 118—49.1 |
| 3,302,609 | 2/1967 | Walker et al. | 118—49 |
| 3,312,190 | 4/1967 | Bradshaw | 118—49.1 |

MORRIS KAPLAN, *Primary Examiner.*